United States Patent
Douglas

(10) Patent No.: US 7,262,569 B2
(45) Date of Patent: *Aug. 28, 2007

(54) ELECTRONIC ROTOR POINTING WITH HIGH ANGULAR RESOLUTION

(75) Inventor: Frank B. Douglas, Tipp City, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 407 days.

This patent is subject to a terminal disclaimer.

(21) Appl. No.: 10/854,823

(22) Filed: May 27, 2004

(65) Prior Publication Data

US 2004/0217722 A1 Nov. 4, 2004

Related U.S. Application Data

(63) Continuation of application No. 10/179,114, filed on Jun. 25, 2002, now Pat. No. 6,762,575.

(51) Int. Cl.
*H02P 1/18* (2006.01)
(52) U.S. Cl. .................... 318/254; 318/439; 318/138
(58) Field of Classification Search .................. None
See application file for complete search history.

(56) References Cited

U.S. PATENT DOCUMENTS

| 4,757,603 | A | | 7/1988 | Stokes |
| 5,057,753 | A | * | 10/1991 | Leuthold et al. ............ 318/254 |
| 5,323,309 | A | * | 6/1994 | Taylor et al. .................. 700/79 |
| 5,329,195 | A | | 7/1994 | Horber et al. |
| 5,423,192 | A | | 6/1995 | Young et al. |
| 5,708,337 | A | * | 1/1998 | Breit et al. ................... 318/439 |
| 5,811,946 | A | * | 9/1998 | Mullin et al. ................ 318/254 |
| 5,869,946 | A | | 2/1999 | Carobolante |
| 5,874,821 | A | | 2/1999 | Monleone |
| 5,878,015 | A | | 3/1999 | Schell et al. |
| 5,949,203 | A | * | 9/1999 | Buthker ....................... 318/254 |
| 6,035,254 | A | | 3/2000 | Nichols |
| 6,078,161 | A | | 6/2000 | Kim et al. |

(Continued)

OTHER PUBLICATIONS

Brian Merritt, Murugavel Raju; PWM DC Motor Control Using Timer_A of the MSP430; Appliation Report; Dec. 2000; Texas Instruments; Dallas, Texas.

(Continued)

*Primary Examiner*—Lincoln Donovan
*Assistant Examiner*—Renata McCloud
(74) *Attorney, Agent, or Firm*—Dinsmore & Shohl LLP

(57) ABSTRACT

A laser level with a sensorless DC motor controller having a feedback sampling circuit connected in parallel with the coil to sense back EMF. An integrator provides a feedback signal from the sensed back EMF, which the amplified difference from a reference level is used as a pulse width control signal. A pulse width modulation generator uses the control signal to generate variable "on" time pulse widths for each motor drive pulse such that high resolution is provided to the DC motor, permitting accurate rotor position at low rotational speeds. It is emphasized that this abstract is provided to comply with the rules requiring an abstract to allow a searcher or other reader to quickly ascertain the subject matter of the technical disclosure. It is submitted with the understanding that is will not be used to interpret or limit the scope or meaning of the claims.

30 Claims, 4 Drawing Sheets

U.S. PATENT DOCUMENTS

| | | |
|---|---|---|
| 6,104,113 A | 8/2000 | Beifus |
| 6,222,340 B1 * | 4/2001 | Kawabata et al. .......... 318/685 |
| 6,507,713 B2 | 1/2003 | Koide |
| 6,600,287 B2 | 7/2003 | Gotou |

OTHER PUBLICATIONS

Mixed Signal Microcontroller; 2001; 1-66; Texas Instruments; Dallas, Texas.

General Purpose CMOS Timer; Philips Semiconductors Linear Products; Aug. 31, 1994; 337-345.

Dual Precision Operational Amplifiers; 2001; 1-22; Texas Instruments; Dallas, Texas.

Greg Paula; Taking Sensors Out of Motors; Mechanical Engineering; Jan. 1998; The American Society of Mechanical Engineers; http://www.memagazine.org/backissues/january98/features/sensout/sensout.html.

CMOS Quad Rail-to-Rail Input and Output Operational Amplifier; Aug. 2000; 1-22; National Semiconductor Corporation; www.national.com.

Motor Drive Control Issues; Control of Motors in Power Electronics; 1996-2002; IEEE; http://www.pels.org/AboutPELS/Areas/motors.html.

Dual Monostable Multivibrator; Integrated Circuits; Jan. 1995; 1-8; Philips Semiconductor.

* cited by examiner

ELECTRONIC ROTOR POINTING WITH HIGH ANGULAR RESOLUTION

CROSS REFERENCE TO RELATED APPLICATIONS

This application is a continuation of U.S. patent application Ser. No. 10/179,114 filed Jun. 25, 2002 now U.S. Pat. No. 6,762,575.

BACKGROUND OF THE INVENTION

The present invention relates generally to the control of DC motors, and particularly, but not exclusively, to a method and apparatus providing electronic rotor pointing with high angular resolution using a sensorless permanent magnet DC motor.

There are numerous techniques in the prior art for controlling the positioning of a rotor of a permanent magnet (PM) DC motor. These techniques can be generalized into two major categories. The first category generally includes those techniques in which a PM DC motor is designed to move at a precise speed in synchronism with, or locked to, the waveform of the driving voltage or current which energizes the windings. PM stepper motors, which have a permanent magnet in the form of a rotor magnetized in alternate polarity "stripes" parallel to the rotor shaft, are used with this type of technique. The step size (angular resolution) of such a motor is entirely a function of the angular "width" of these magnetized stripes, and an angular resolution of 7.5 degrees is common in most inexpensive motors. However, costs increase greatly if such motors are to provide high resolution in the 2 to 5 arc minute range. Additionally, PM stepper motors move in steps by sending pulse trains of varying polarity to multiple windings. The frequency of the pulses and the phasing between the pulses applied to the various windings determines the speed and direction of motor motion, respectively. As a result, precise control over rotor positioning is provided, but at the cost of control circuitry complexity.

The second category of PM DC motor rotor positioning techniques includes those in which sensors are external to, or built into, the motor. Typically, such position sensors include Hall effect sensors and optical encoders. With Hall effect sensors, resolution is limited by the number, the positioning accuracy, and the gain tolerance of the sensors. With optical encoders, high resolution is provide at a higher cost. Optical encoders require electronics for decoding and accumulation. Such a system requires initialization, and over time may also require alignment and adjustment. Accommodating either Hall effect sensors or optical encoders also increases the size of the resulting device.

Conventional laser levels typically use the rotor of a sensorless permanent magnet DC motor to rotate a prism. The prism reflects a beam of laser light used in leveling operations. The operator controls such a sensorless DC motor using open loop control (no feedback) and therefore, moves the beam at a desired speed by increasing or decreasing the DC voltage applied to the motor. In order to position a beam in a desired direction with such an arrangement, the operator typically jogs the DC motor (applies a succession of voltage pulses) to point the laser beam at a small, distant object. However, with open loop control, rotor pointing by jogging the motor is inaccurate, often unrepeatable, and can be frustrating to the operator due to the lack of reliable beam pointing.

For example, stopping the laser beam on a two-inch wide object 100 feet away requires a DC motor speed of about one revolution per minute given an average human reaction time of 100 ms and a typical 6:1 drive ratio. However, rotating a DC motor at such slow speeds is problematic, since a motor's resolution changes with temperature and at different angular positions due to unavoidable variations in the manufacturing process and wear patterns of a motor's bearings. These variations make fine positioning operations at such a slow speed difficult with open loop control of a PM DC motor. However, due to space and cost considerations, using a stepper motor and/or position sensors in a laser level for closed loop rotor positioning control of the DC motor to provide acceptable resolution is not economical.

Therefore, a method and apparatus are needed for providing electronic rotor pointing to a sensorless permanent magnet DC motor, which take into account friction, temperature, bearing manufacturing, and wear pattern variations to provide accurate, repeatable, and reliable resolution position control.

SUMMARY OF THE INVENTION

The present invention is a sensorless control method and circuit which uses back electromagnetic force (EMF) as a feedback control to position a beam of electromagnetic energy within a few arc-minutes of a desired angular position. The system moves a sensorless PM DC motor in fine angular increments by applying short, high current drive pulses, which overcome static friction and induce movement of the rotor. A measurement of the rotor's angular distance moved due to the drive pulses is obtained by integration of a sampled back EMF voltage generated by the motor in a time window following each pulse. This measurement of the rotor's angular distance moved per pulse is used to control the pulse width or "on" time of the next drive pulse applied to the motor, thereby resulting in accurate, repeatable, and reliable fine positioning operation of about 2 to 5 arc minutes.

Sensorless control systems, such as the type provided by the present invention, possess a number of advantages. Although the present invention is not limited to specific advantages or functionality, it is noted these advantages include reduced component and sensor costs, reduced tooling and manufacture costs, improved reliability, and invariance to changes in the operating environment and noise reduction.

In one aspect of the invention, one embodiment comprises a method for providing improved angular resolution to a sensorless permanent magnet DC motor for rotor pointing. The method comprising supplying to the motor a pulse width modulated (PWM) motor drive pulse having an "on" time of a pulse width, and providing a sampling delay which prevents sampling of inductive stored energy of the motor. The method further includes providing after the sampling delay, a sampling window for sampling back EMF of the motor, and changing the pulse width of the "on" time of the motor drive pulse based on sampled back EMF in order to adjust rotor speed, thereby maintaining a set angular distance in a set time-period.

Another embodiment of the invention comprising a method of providing improved angular resolution at rotational speeds below about 1 rpm to a rotor of a sensorless permanent magnet DC motor used to move and position a beam of electromagnetic energy. The method comprises supplying to the motor a pulse width modulated (PWM) motor drive pulse having an "on" time of a pulse width which produces rotor motion, and an "off" time. The method further includes providing after a sampling delay, a sampling window for sampling back EMF of the motor during the "off" time, and changing the pulse width of the "on" time of the motor drive pulse. The "on" time is based on the sampled back EMF and its pulse width is varied to adjust rotor speed and maintain a set angular distance in a set time-period. The sampling delay prevents sampling of inductive stored energy of the motor after expiration of the "on" time.

In another aspect of the present invention, one embodiment provides a motor controller for driving and providing close loop control of a sensorless permanent magnet DC motor with improved angular resolution for rotor pointing. The motor controller comprises motor drive logic adapted to drive the motor with a series of motor drive pulses. Each of the motor drive pulses has an "on" time pulse width and an "off" time pulse width. Pulse width control logic is adapted to set the "on" time pulse width. The motor controller further includes feedback sample logic adapted to measure back EMF generated by the motor. The feedback sample logic provides a sampling delay which prevents sampling of inductive stored energy of the motor after expiration of the "on" time pulse width, and a sampling window for sampling the back EMF of the motor during the "off" time pulse width. The pulse width control logic is adapted to vary the "on" time pulse width of the motor drive pulse based on sampled back EMF in order to adjust rotor speed and maintain a set angular distance in a set time-period.

Another embodiment of the invention comprises a motor controller adapted to drive a sensorless permanent magnet DC motor and to provide improved angular resolution for the motor rotor position. The motor controller comprises a motor drive stage having gate actuator logic, power switches adapted to energize at least one winding of the motor and being controlled by the gate actuator logic with a series of drive pulses, and a frequency generator adapted to provide a timing signal to the actuator logic for modulation of the drive pulses. Each of the drive pulses has a variable "on" time and an "off" time. The motor controller further includes a pulse width control stage that provides a control signal to the gate actuator logic. The control signal sets a pulse width of the "on" time for each of the drive pulses. A feedback sampling stage is connected in parallel with the motor winding and is adapted to sample back EMF generated by the motor. The feedback sample stage has switching logic which provides a sampling delay to prevent sampling of inductive stored energy of the motor after expiration of the "on" time for each of the drive pulses. The feedback sample stage further includes sample buffer logic which provides a sampling window for sampling the back EMF after expiration of the sampling delay. The sampled back EMF is integrated and compared to a reference to provide an input voltage to the pulse width control stage based on the integrated back EMF. The pulse width of the "on" time is set for each of the drive pulses in order to adjust the rotor speed to maintain a set angular distance in a set time-period. This results in improved angular resolution.

In still another embodiment, a laser level having electronic rotor pointing with high angular resolution comprises a sensorless permanent magnet DC motor, and a motor controller. The motor controller comprises motor drive logic that is adapted to drive the motor with a series of motor drive pulses, each motor drive pulse having an "on" time pulse width and an "off" time pulse width. The motor controller further includes pulse width control logic adapted to set the "on" time pulse width, and feedback sample logic adapted to measure back EMF generated by the motor. The feedback sample logic provides a sampling delay that prevents sampling of inductive stored energy of the motor after expiration of the "on" time pulse width, and a sampling window for sampling the back EMF of the motor during the "off" time pulse width. The pulse width control logic is adapted to vary the "on" time pulse width of the motor drive pulse based on sampled back EMF. This adjusts rotor speed to maintain a set angular distance in a set time-period. The laser level further includes a power circuit for powering the laser level.

In yet another embodiment, a laser level has electronic rotor pointing with high angular resolution. The laser level comprises a sensorless permanent magnet DC motor having a rotor adapted to rotate and position a beam of laser light, and a motor controller adapted to drive the sensorless permanent magnet DC motor, thereby providing improved angular resolution for the rotor. The motor controller comprises a motor drive stage having gate actuator logic, and power switches adapted to energize at least one winding of the motor. This results the gate actuator logic controlling the motor with a series of drive pulses. The motor controller further includes a frequency generator adapted to provide a timing signal to the actuator logic for modulation of the drive pulses, each the drive pulses having a variable "on" time and an "off" time. A pulse width control stage adapted to provide a control signal to the gate actuator logic. The control signal sets a pulse width of the "on" time for each of the drive pulses. The motor controller further includes a feedback sampling stage connected in parallel with the motor winding and adapted to sample back EMF generated by the motor. The feedback sample stage has switching logic which provides a sampling delay to prevent sampling of inductive stored energy of the motor after expiration of the "on" time for each of the drive pulses, and a sample buffer logic which provides a sampling window for sampling the back EMF after expiration of the sampling delay. The sampled back EMF is integrated and compared to a reference to provide an input voltage to the pulse width control stage. The pulse width control stage sets the pulse width of the "on" time for each of the drive pulses in order to adjust the rotor speed and maintain a set angular distance in a set time-period, thereby providing the improved angular resolution. The laser level further includes a power circuit for powering the laser level.

These and other features and objects of the present invention will be apparent in light of the description of the invention embodied herein. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which.

DETAILED DESCRIPTION OF THE PREFERRED EMBODIMENTS

Figure 1:
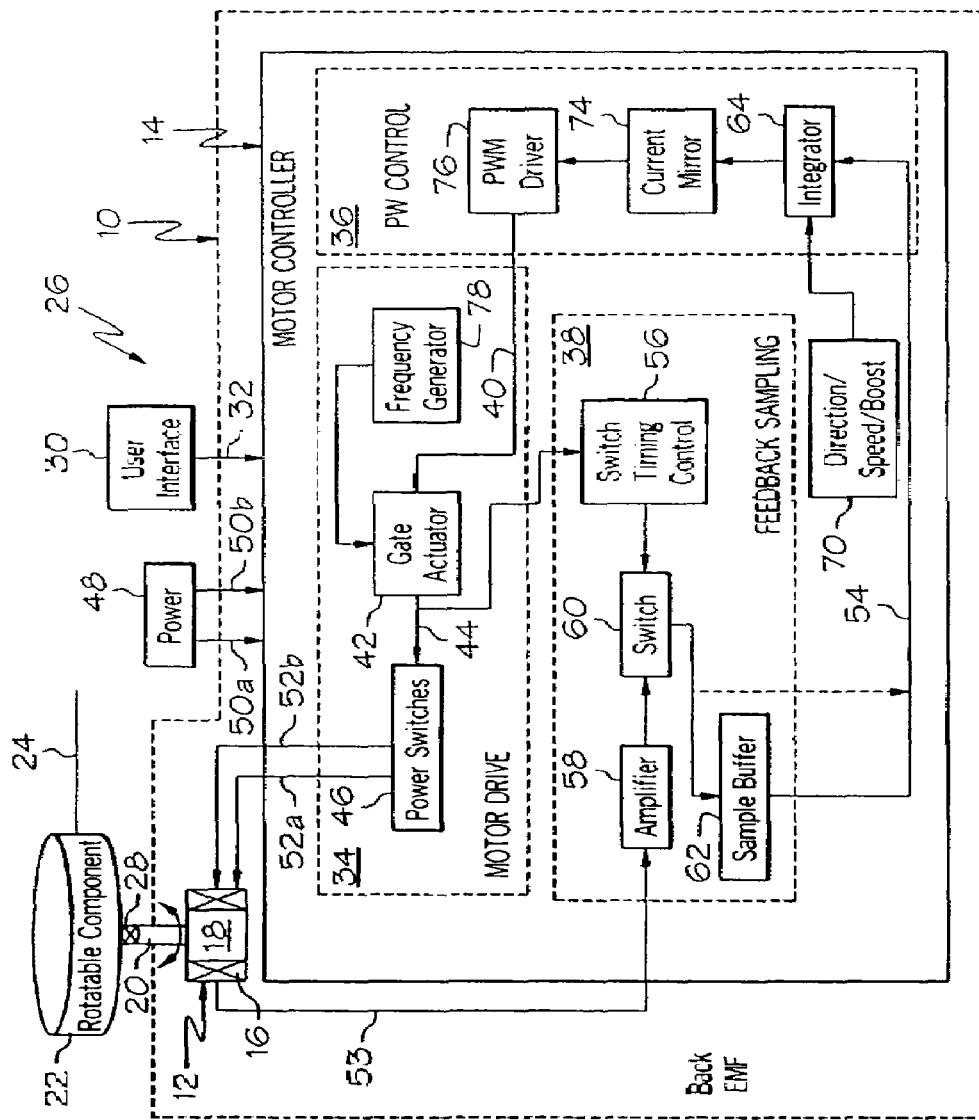
FIG. 1 is a block diagram illustration of a motor controller suitable for providing high angular resolution to a sensorless motor in accordance with the present invention, the motor controller including a feedback sampling logic, a pulse width control logic, and a motor drive logic.

Referring to FIG. 1, a motor control system, generally indicated at 10, embodies aspects of the present invention. The motor control system 10 includes a motor 12, and a motor controller 14. The motor 12 has a stationary assembly, or stator, 16 and a rotatable assembly, or rotor, 18 in magnetic coupling relation to the stator 16.

In the embodiments described herein, the motor 12 is a conventional permanent magnet DC motor. It is contemplated, however, that aspects of the present invention may be applicable to various electronically controllable motors or dynamoelectric machines typically powered by an electronic control circuit. Such motors include, for example, external rotor motors (i.e., inside out motors), permanent magnet motors, single and variable speed motors, selectable speed motors having a plurality of speeds, brushless DC motors, ironless rotor DC motors, "pancake" style DC motors, electronically commutated motors, switched reluctance motors and induction motors. Such motors may also provide one or more finite, discrete rotor speeds selected by an electrical switch or other control circuit.

As an example, motor 12 is a DC motor which has permanent magnets mounted on its stator 16. As is known in the art, the rotor 18 of such a motor has one or more wire-wound coils, or windings. The winding or windings on rotor 18, when energized with current, interact with the permanent magnet stator 16 to produce positive or negative torque, depending on the direction of the current relative to the polarity of the magnets.

A motor shaft 20 mechanically connects rotor 18 to a particular device to be driven, such as a rotatable component 22. For example, the rotatable component 22 comprises an electromagnetic beam source or a platform for redirecting a beam of electromagnetic radiation such as a laser beam 24. The platform may include a prism or prism and/or one or more mirrors for redirecting a beam of by reflection and/or refraction. Such a motor control system 10 may be included in a laser leveling system, generally indicated as 26.

Although the motor control system 10 is particularly useful for driving and pointing the laser beam 24 of the laser leveling system 26 within a few arc-minutes of a desired angle, it is to be understood that motor control system 10 may be part of a number of different systems for driving other rotatable components. For example, rotatable component 22 may be part of a servo system used to control the motion of a robotic targeting system of a surveying system, such as the type disclosed by commonly assigned U.S. Pat. No. 6,035,254, the entire disclosure of which is incorporated herein by reference. In addition, rotatable component 22 may also include a connection mechanism 28 for coupling it to shaft 20. For example, the connection mechanism 28 may be a belt pulley system or a gearbox providing an increase or reduction in the angular velocity (i.e., RPMs) of the rotatable component 22.

A user interface or system control 30 provides system control signals to the motor controller 14, via line 32. In one embodiment, the user interface 30 is a set of contact switches and the system control signals take the form of motor commands representing, for example, turn on and turn off commands, an increase speed command (fast), a rotation direction command (i.e., clockwise or counterclockwise), and the like. In response to the system control signals, motor controller 14 then generates motor control signals. In other embodiments, the user interface 30 may be electronically implemented with, or remotely from, the motor controller 14.

For manual positioning applications, to accommodate a human reaction time of about 100 ms, the motor 12 needs to be rotated at a very low speed. In one embodiment, the available speed range for the motor is about 0.5 RPM to about 50 RPM. The motor used in this embodiment will generate a back electromechanical force (EMF) of about 600 microvolts at about 1 RPM. Other motors will generate a different value of back EMF which, as known by those skilled in the art, is the product of the back EMF constant for the specific type of motor used, and the motor's speed.

At very low speeds, the back EMF can be measured by briefly turning off the motor's drive current and then measuring the terminal voltage after the inductive stored energy in the energized winding, or windings, has dissipated. Applying short high current pulses creates the "off" periods in which to measure the back EMF of motor 12. In addition to creating the "off" periods, applying short high current pulses also creates a "jolt" which breaks the rotor 18 free of static friction, and with each pulse moves the rotor a small angular amount. Since the inductive stored energy in the energized winding, or windings, can be dissipated much more quickly then the mechanical time constant due to inertia, the motor will remain in motion while the back EMF is sampled during the "off" periods of the drive current pulse.

Integrating the sampled back EMF gives an indication of rotor speed, which is then used to adjust the pulse width (on-time) of the next drive current pulse. Integrating the sampled back EMF has the advantage of averaging out "ringing" or oscillating voltages superimposed on the back EMF voltage. Such ringing may be caused by mechanical resonance or resonances in the rotor, the stator, the mounting component or components, the connection mechanism to the rotatable component, the rotatable component, and electrical resonance due to the interaction of the inductance of the windings and the capacitance in the motor drive circuit.

As represented by the block diagram of FIG. 1, the above method of sensorless DC motor control is implemented for illustration purposes in logic stages of the motor controller 14. These logic stages include motor drive logic 34, pulse width control logic 36, and feedback sampling logic 38. It is to be appreciated that circuitry components, transistor logic, and programmable logic circuits, such as a microprocessor or microcontroller and/or an application specific integrated circuit (ASIC) or universal electronically commutated motor integrated circuit (UECM IC), and combinations thereof, maybe used to implement the following illustrative control circuit 14.

Pulse width control logic 36 provides, via line 40, a pulse width control signal to control electronically a plurality of gate actuators 42. In turn, gate actuators 42 provide drive signals, via line 44, for switching a plurality of power switches 46 (e.g., insulated gate bipolar transistors, bipolar junction transistors or metal oxide silicon field effect transistors, etc.). It is to be appreciated that the pulse width control signal sets the "on" and "off" ratio for the drive signals, which are made variable depending on the results of feedback sampling logic 38.

Varying the "on" time for each drive signal provides, at low rotor RPMs (e.g., 1 rpm), a simple, low cost, and efficient method of providing high resolution in rotor positioning. Since the motor 12 is driven with a pulse width modulation (PWM) signal, varying the duty cycle of the signal will vary the drive time of the output. Therefore, by basing the duration of the drive time on the integration of the back EMF, the motor 12 is locked into making fine speed changes to maintain a set angular rotation in a set time-period, thereby providing high positioning resolution of the rotor 20 in this self-sensing (closed-loop) motor control system.

In one implementation of the invention, each gate actuator 42 is a retriggerable-resettable monostable multivibrator (e.g., HEF 4528B, etc.), wherein the "on" duration of the drive signal from the multivibrator is determined by the pulse width control signal from the pulse width control logic 36. In other embodiments, the gate actuators 42 may be logic of a microprocessor or microcontroller and/or an ASIC or UECM IC, so long as the pulse width of the drive signal can be made variable based on the integrated voltage of the back EMF from motor 12.

A power supply 48 provides sufficient DC power (e.g., 5 volts) to motor controller 14 and power switches 46, via lines 50a and 50b, respectively. Power switches 46 power motor 12 via rails 52a and 52b, which represent the electrical connection between power switches 46 and the motor winding of stator 16. In response to system control signals (e.g., clockwise, counterclockwise, hi/low speed, etc.) from the user interface 30, each gate actuator 42 selectively activates power switches 46, and thus rails 52a and 52b, providing rotation speed and direction to motor 12.

As an example, an H-bridge circuit embodies power switches 46 for driving motor 12. The H-bridge circuit may include a number of power transistors run by TTL or CMOS logic to selectively connect the winding of motor 12 to power circuit 48, either positive or negative, in order to effect clockwise or counterclockwise rotation. The H-bridge circuit has an upper, or positive, rail (i.e., rail 52a), and a negative, or lower, rail (i.e., rail 52b), supplied by power circuit 48, via respective power lines 50a and 50b for such rotational direction control. To prevent current surges in the reverse direction across the inductive load, fly-back diodes may be used to create a return path for the current.

In one embodiment, the rails 52a and 52b are used in combination with link capacitors and fly-back diodes, constituting a power supply link, also referred to as a DC link, for providing DC power and current-surge protection to the motor winding of stator 16. Such H-bridge circuit may be provided in IC chips (e.g., L293, L6202, etc.), via a powered MOSFET (e.g., Si9928DY, etc.), or as logic of a microprocessor or microcontroller (e.g., MSP430F1491, etc.). Additionally, the H-bridge circuit may be provided by an ASIC or UECM IC, so long as the powering and rotational direction of the motor 12 is controllable.

Feedback sampling logic 38 generates output signals received by pulse width control logic 36, via line 54. These output signals are representative of the necessary pulse width adjustment or "on" time adjustment per motor drive pulse. In general, each output signal of the feedback sampling logic 38 is a voltage related to the back EMF of motor 12 generated over a fix sampling window.

Figure 4:
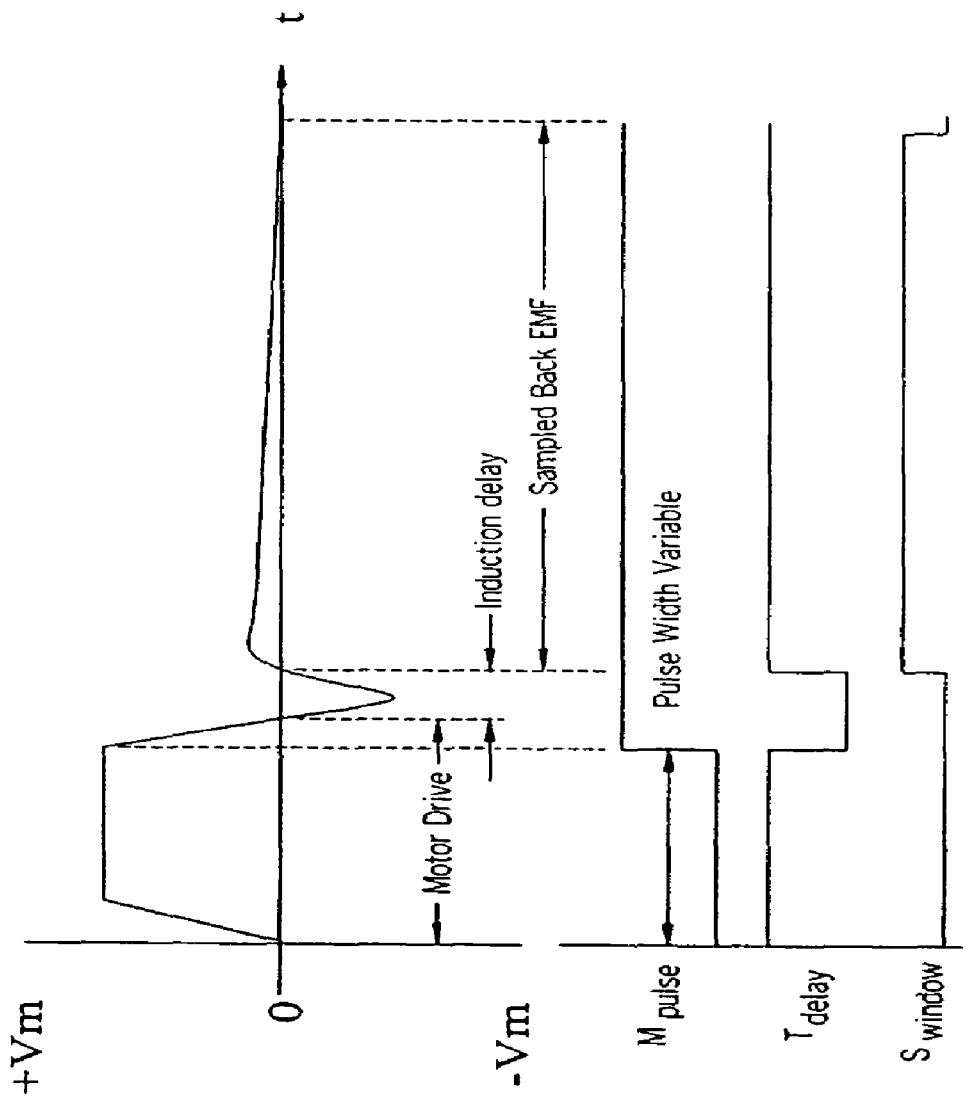
FIG. 4 illustrates representative signals associated with the motor controller for providing high angular resolution for a sensorless motor according to the present invention.

With reference to FIG. 4, each motor drive pulse (Mpulse) from the gate actuator 42 switches on the appropriate power switches 46 to power motor 12. With motor 12 powered, the motor voltage (Vm) increases until it reaches a steady state during the "on" period for each drive pulse. When the motor drive pulse (Mpulse) transitions to the "off" period, the motor voltage (Vm) decreases. As part of this "off" period, there is an inductive stored energy decay before the generation of the back EMF. To prevent this inductive stored energy decay from being sampled, a sample delay (Tdelay) is required. Further to ensure that only the back EMF is sampled during this "off" period of the drive pulse (Mpulse), the width of this sampling window (Swindow) needs also to be defined.

Figure 2:
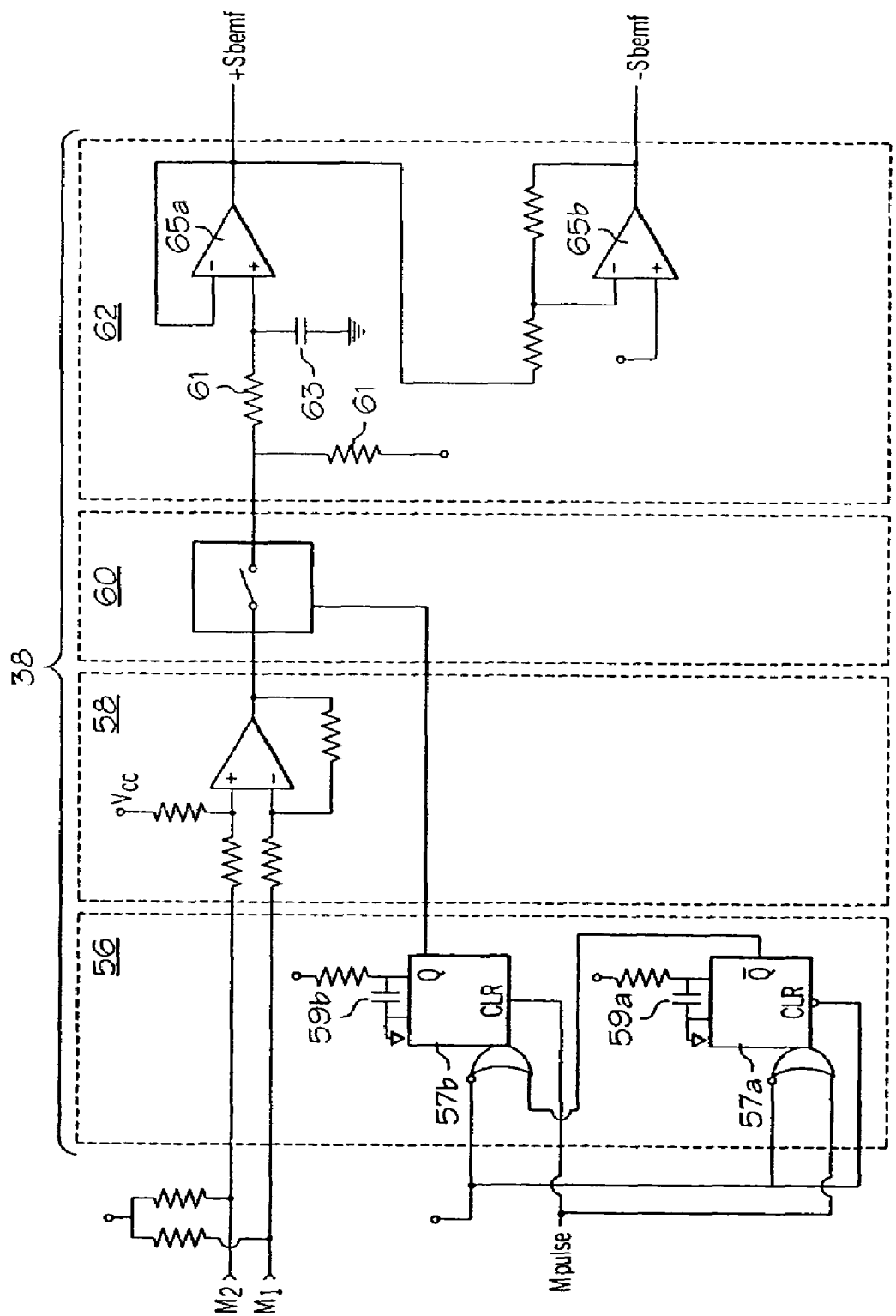
FIG. 2 is a circuit diagram that illustrates an implementation of a feedback sampling logic according to the present invention.

FIG. 2 is a circuit diagram that illustrates one implementation of the feedback sampling logic 38 according to the present invention which provides a sampling delay (Tdelay) and sampling window (S window). The feedback sampling logic 38 comprises a switch timing control 56, a voltage amplifier 58, a switch 60, and a sample buffer 62. The voltage amplifier 58 is conventional op-amp (e.g., LT1013 op-amp, LMV922M, etc.) configured to provide as its voltage output the generated back EMF of the motor 12. During the "on" time of the motor drive pulse the input to the voltage amplifier 58, via coupling 53, is either the clockwise or counterclockwise drive voltages provided to motor 12, via rails 52a and 52b, respectively. However, during the "off" time of the motor drive pulse, the input to the voltage amplifier 58 will be the inductive load and the back EMF.

To sample only the back EMF, the output connect of the voltage amplifier 58 to the sample buffer 62 is toggled via switch 60 (e.g., 4066 bilateral switch) to provide the sampling delay (Tdelay) and sampling window (S window). This toggling is control by the switch timing control 56, which in the illustrated embodiment comprises two monostable multivibrators (e.g., 4528). The switch timing control 56 is configured such that the switching of the output state of the first multivibrator 57a triggers the switching of the output state of the second multivibrator 57b. In this arrangement, the ending of the motor drive pulse (Mpulse) triggers the output state of the first multivibrator 57a, which introduces the sampling delay (Tdelay). At the beginning of the next motor drive pulse (Mpulse), the presence of the motor drive pulse (Mpulse) resets the triggering of the second multivibrator 57b output state.

After expiration of the sampling delay period (Tdelay), which is set by a first timing capacitor 59a, switching of the output state of the first multivibrator 57a triggers the output state of the second multivibrator 57b. Triggering the output state of the second multivibrator 57b closes switch 60 such that feedback sampling logic 38 samples, via sample buffer 62, the back EMF detected by voltage amplifier 58. Switch 60 remains closed until the output state of the second multivibrator 57b is switched by the expiration of the sampling window period (Swindow), which is set-also by a second timing capacitor 59b. In one embodiment, the sample delay is set to 0.5 millisecond, and the sampling window is set to 6.5 milliseconds.

In one embodiment, sample buffer 62 comprises resistors 61, and hold capacitor 63 in series with a voltage follower 65a (e.g., LMC6484 op-amp, etc.). The voltage follower 65a (buffer) produces the sampled back EMF voltage stored in the hold capacitor 63 as it outputs and provides effective isolation of the signal source to avoid loading effects. Since the motor 12 may be driven in either a clockwise (CW) or a counterclockwise (CCW) direction, the output of the voltage follower 65a is inverted (e.g., via another LMC6484 op-amp, etc.), to provide both positive (clockwise) and negative (counterclockwise) back EMF voltage outputs, via line 54, for use by the pulse width control logic 36.

Figure 3:
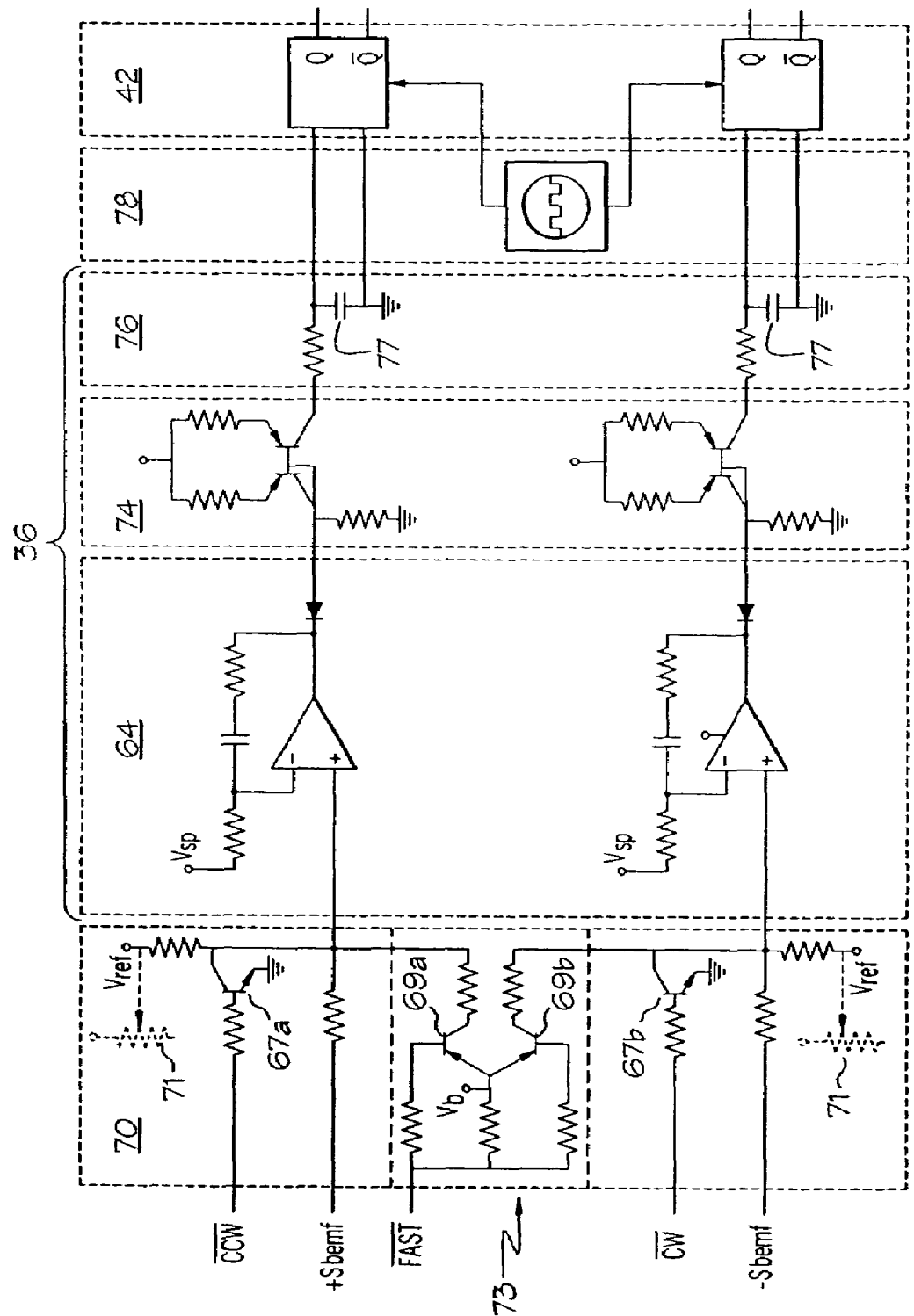
FIG. 3 is a circuit diagram that illustrates an implementation of a pulse width control logic according to the present invention.

In the exemplary pulse width control logic 36 illustrated by FIG. 3, the integrated back EMF voltage output of the feedback sampling logic 38 is selectively switched by a related direction control signal (i.e., CW, CCW) of the user interface 30. In this manner, the sampled back EMF voltage output for the user-selected direction is processed by the pulse width control circuit 36. Direction and speed control is provided for by direction and speed control logic 70 (FIG. 1).

In the embodiment shown by FIG. 3, the direction and speed control logic 70 comprises a pair of transistors 67a and 67b, one for each direction. Each transistor is active when the opposite direction control signal (CW or CCW) is selected which permits an associated reference voltage (Vref) to be added to the sampled back EMF voltage output (Sbemf) for the selected direction and to pull down the opposite sample back EMF voltage output and associated reference voltage (Vref). For example, when a clockwise command direction control signal (CW) is selected at the user interface 30, both the counterclockwise reference voltage and its associated back EMF voltage output from the feedback sampling logic 38 are pulled to ground by the related transistor 67b, driving the input to an associated pulse width control circuit 36 to zero, and vice verse.

An associated potentiometer 71 may be used to manually adjust/control the amount of reference voltage (Vref) that is summed with the sampled back EMF voltage output (Sbemf) for variable speed control. Additionally, the motor 12 may be driven at a faster rotational speed by providing a voltage boosting circuit 73. In the illustrated embodiment, the voltage boosting circuit 73 comprises a pair of transistors 69a and 69b, one for each direction, which are enabled by a FAST signal selected at the user interface 30. When enabled, the voltage output from the feedback sampling logic 38 is boosted by a boost voltage (Vb) to the maximum input voltage for the pulse width control circuit 36. As will be explained hereafter, boosting the input voltage to the pulse width control circuit 36 to maximum, drives the motor 12 at a faster rotational speed under control of the motor controller 14.

For continuous rotation at speeds above about 50 RPMs, additional control inputs provide power switches 46 with signs to drive the motor at higher RPMs. In one embodiment, lines 44 to the power switches 46 are the same lines used for both low RPM's and high RPM's, and the change in the control method is performed internally to the microprocessor in the software or firmware. Such a control method may be either a conventional pulse width modulated (PWM) speed control method, or PWM combined with EMF, or PWM combined with a sampled back EMF method, wherein the PWM drive periodically is turned off for short a period of time to obtain a back EMF sample. These control inputs can be from a microprocessor, an ASIC or UECM IC.

In the illustrated embodiment of FIG. 3, the pulse width control circuit 36 in each rotational direction comprises an integrator 64, and a pulse width modulation (PWM) driver 76. Each integrator 64 is an operational amplifier (i.e., LM6484) which receives the associated sampled back EMF voltage (Sbemf) output of the feedback sampling logic 38 as one of its inputs. Each integrator 64 is active when its associate voltage output from the feedback sampling logic 38 is not pulled to ground by direction and speed control logic 70. The other input to each integrator 64 is a reference speed control voltage (Vsp), which is derived from a desired speed input set by the user interface 30.

As mentioned above, since the motor 12 remains in motion during the "off" periods of the drive pulse due to inertia, the voltage sampled from line 53 during this "off" period is the generated rotor back EMF. Accordingly, during this "off" period the input to voltage amplifier 58 is the rotor generated back EMF and a control voltage (Vcc) to provide the sampled back EMF (Sbemf) output. Integrating the sampled back EMF voltage (Sbemf) with integrator 64 provides an indication of rotor speed, which is then used to adjusting the pulse width of the "on" time of the next drive current pulse.

The response of the "active" integrator 64 to the input voltage (Sbemf) is a pulse width control signal which drives the pulse width modulation driving logic 76. In particular, the pulse width control signal sets the pulse width of the "on" time of the motor drive pulse of the gate actuators 42. Accordingly, through the feedback sampling of the back EMF generated by the motor 12, the controller 14 increases or decreases rotor speed by varying the pulse width "on" time of the motor drive pulse such that substantially the same angular distance is covered with each motor drive pulse. For example, in one embodiment, the "on" time pulse width of the motor drive pulse varies linearly from about 55 microseconds at a resulting minimum pulse width control voltage of about 0.62 volts to about 800 microseconds at a resulting maximum pulse width control voltage of about 4.3 volts.

In the illustrated embodiment, current mirror 74 is used such that the active load from the integrator 64 is capable of driving the PWM driver 76 with only the low integrated voltage of the back EMF. The current mirror 74 comprises a matched pair of transistors having their base coupled to an associated integrator 64, their emitters coupled to a reference voltage, and one of the collectors coupled to its base, and the other coupled to the PWM driver 76. When the emitters of the transistors of the current mirror 74 associated with one of the integrators 64 are pulled low, the current mirror 74 basically turns-off, and therefore does not interfere with the PWM driver varying the pulse width of the driving signal, driving the motor in the opposed direction. As such, the current mirror 74 acts as the collector load and provides a high effective collector load resistance, increasing the gain.

In this arrangement, the voltage output from the feedback sampling logic 38 is converted to a current via the current mirror 74. This current is then provided to the PWM driver 76, which charges a timing capacitor 77 to set the width of the drive pulse of the gate actuator 42, wherein the discharge time is fixed. A frequency generator 78 (e.g., CMOS timer, monostable multivibrator, microprocessor, etc.) is used to provide an accurate duty cycle frequency. In one embodiment, the frequency generator produces a frequency of about 100 hertz.

To enable the motor speed to go to zero, the minimum charge time of the timing capacitor 77 produces a pulse shorter than the minimum width needed to move the motor. At low speeds, the power needed is lower and so the on time is smaller implying that the frequency of pulses could be made higher. This means that the system could be sampled more often, which gives better control at low speeds. At high speeds, the sampling is less often, producing a linear function in the loop.

In another implementation of the present invention, using a microprocessor to perform motor controller 14 functions, with the exception of the power switches 46 and amplifier 58, the frequency with which the motor is pulsed and the back EMF sampled, represented by the frequency generator 78, which is now internal to the microprocessor, is made adjustable. One result is that the motor can be moved even more slowly while maintaining usable control over its speed by reducing the frequency with which the motor is pulsed and the back EMF sampled, while at the same time maintaining a low reference speed control voltage (Vsp). Conversely, a higher frequency can be used, up to the limitations set by the "on" time of the motor drive pulses, the inductive energy decay time, and the sampling or integration time, for faster controlled movement, but it becomes more practical to simply increase the reference speed control voltage (Vsp). Where continuous rotation at high RPM's is required, a different control method can be used by the microprocessor. Also, the microprocessor can determine, based on the user input commands, which method to use.

Accordingly, with the circuit logic of the present invention, while the time between pulsing the motor on and sampling the generated voltage is fixed, the motor "on" time is variable to provide a more accurate motor resolution at slow speeds below about 1 RPM. This more accurate motor resolution results from the present invention adjusting the "on" time of the next motor drive pulse in order to increase or decrease rotor speed such that approximately the same angular distance is covered with each motor pulse. In this manner, the present invention accounts for temperature changes and the variations at different angular positions due to the manufacturing process, as well as the uneven wear of motor bearings. Furthermore, the circuit logic of the present invention enables in one embodiment, such as in a laser level, the positioning of a beam of electromagnetic energy rotated by the motor rotor within a few arc-minutes of a desired angular position. The adjusting of the "on" time on the next motor drive pulse according to the sampled and integrated back EMF according to the circuit logic of the present invention, provides accurate, repeatable, and reliable fine positioning operation to a laser level having a sensorless PM DC motor.

To those skilled in the art, many changes and modifications will be readily apparent from consideration of the foregoing description of a preferred embodiment without departure from the spirit of the present invention. For example, in still another embodiment, the motor drive logic 34, the pulse width control logic 36, and the feedback sampling logic 38 may also be implemented, in part or whole, using logic of a microprocessor or microcontroller (e.g., MSP430F149I) and/or an ASIC or UECM IC, to provide a sampling delay which prevents the sampling of the inductive stored energy of the motor, a sampling window for sampling the back EMF, and to change the pulse width of the "on" time of the motor drive pulse based on the sampled back EMF in order to adjust rotor speed for high resolution at low speeds. Additionally, it is to be appreciated that the descriptions herein and the disclosures hereof are by way of illustration only and should not be construed as limiting the scope of the present invention which is more particularly pointed out by the following claims.

What is claimed is:

1. A method for providing improved angular resolution to a DC motor, the method comprising:
   providing a motor drive pulse having a pulse width to the motor;
   providing a sampling window for sampling back EMF of the motor;
   sampling and integrating said back EMF of the motor in said sampling window; and
   changing said pulse width of said motor drive pulse based on the sampled and integrated back EMF in order to adjust rotor speed of the motor to maintain a set angular distance in a set time-period.

2. The method as recited in claim 1 wherein said DC motor is a sensorless permanent magnet DC motor.

3. The method as recited in claim 1 wherein said motor drive pulse has an on-time which energizes the motor, and an off-time diring which the motor is deenergized.

4. The method as recited in claim 3 further comprising providing a sampling delay following said on-time of said motor drive pulse which prevents sampling of inductive stored energy of the motor.

5. The method as recited in claim 1 further comprising providing before said sampling window a sampling delay, wherein said sampling delay begins at an off-time of said motor drive pulse and ends about 0.5 millisecond thereafter.

6. The method as recited in claim 1 wherein said sampling window is set to about 6.5 milliseconds.

7. The method as recited in claim 1 wherein said sampled and integrated back EMF is compared to a reference voltage to determine an amount of said change to an on-time of said pulse width.

8. The method as recited in claim 1 wherein the angular resolution is in the range of about 2 to about 5 arc minutes.

9. A method of providing improved angular resolution at rotational speeds below about 1 rpm to a rotor of a sensorless permanent magnet DC motor used to move and position a beam of electromagnetic energy, said method comprising:
   providing a sampling delay which prevents sampling of inductive stored energy of the motor;
   providing after said sampling delay, a sampling window for sampling back EMF of the motor;
   integrating said sampled back EMF; and
   changing a pulse width of a motor drive pulse controlling rotation of the motor based on said sampled back EMF in order to adjust rotor speed to maintain a set angular distance in a set time-period.

10. The method as recited in claim 9 further comprising supplying the motor said motor drive pulse, wherein said pulse width has an "on" time which imparts rotor motion.

11. The method as recited in claim 9 further comprising supplying the motor said motor drive pulse, wherein said pulse width has an "on" time which imparts rotor motion, and wherein said sampling delay prevents sampling of inductive stored energy of the motor after expiration of said "on" time.

12. The method as recited in claim 9 wherein said sampling delay lasts about 0.5 millisecond.

13. The method as recited in claim 9 wherein said sampling window is about 6.5 milliseconds.

14. The method as recited in claim 9 wherein said integrated back EMF is compared to a reference voltage to determine amount of said change to said pulse width.

15. The method as recited in claim 9 wherein said electromagnetic energy is laser light.

16. The method as recited in claim 6, wherein the angular resolution is in the range of about 2 to about 5 arc minutes.

17. A motor controller for driving a sensorless permanent magnet DC motor with a motor drive pulse and providing an improved angular resolution for rotor pointing, the motor controller comprising:
   feedback sample logic adapted to measure back EMF generated by the motor, said feedback sample logic providing a sampling delay which prevents sampling of inductive stored energy of the motor, and a sampling window for sampling said back EMF of the motor after said sampling delay, and
   pulse width control logic adapted to integrate and compare sampled back EMF to a reference voltage to determine an amount of change to a pulse width of the motor drive pulse in order to adjust rotor speed to maintain a set angular distance in a set time-period.

18. The motor controller as recited in claim 17 wherein said sampling delay lasts about 0.5 millisecond.

19. The motor controller as recited in claim 17 wherein said sampling window is about 6.5 milliseconds.

20. The motor controller as recited in claim 17 wherein the angular resolution is in the range of about 2 to about 5 arc minutes.

21. The motor controller as recited in claims 17 wherein said motor controller is implemented with elements selected from the group comprising circuitry components, transistor circuits, programmable logic circuits, a microprocessor, a microcontroller, an application specific integrated circuit an universal electronically commutated motor integrated circuit, operational amplifier circuits, analog switches, and combinations thereof.

22. The motor controller as recited in claims 17 wherein said pulse width has an on-time which imparts rotor motion.

23. The motor controller as recited in claims 17 further comprising a motor drive logic having power switches adapted to energize at least one winding of the motor and being controlled by said motor drive pulse.

24. The motor controller as recited in claim 17 wherein said sampling delay is trigger by said motor drive pulse.

25. The motor controller as recited in claim 17 further comprising circuit logic for signal amplification of the generated back EMF.

26. The motor controller as recited in claim 17 wherein said pulse width control logic further includes a current mirror coupled between an integrator receiving said sample back EMF and a timing capacitor used to set an "on" time of said motor drive pulse based on said reference voltage.

27. The motor controller as recited in claim 17 further comprising a direction and speed control logic adapted to control rotation direction and rotation speed of the motor.

28. The motor controller as recited in claim 27 wherein said direction and speed control logic further include speed boost logic adapted to boost said reference voltage to a maximum value in order to rotate the motor at a faster rotational speed.

29. The motor controller as recited in claim 27 wherein said direction and speed control logic including a potentiometer to manually adjust/control an amount of said reference voltage for variable speed control.

30. The motor controller as recited in claims 17 provided in a laser level having the sensorless permanent magnet DC motor.

* * * * *